Patented Feb. 6, 1923.

1,444,331

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing.   Application filed April 30, 1921. Serial No. 465,929.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates, but is not limited, to the ethers having that property. While the ethers form thin solutions in the lower monohydroxy aliphatic alcohols or in phenyl propyl ether, it has been found that such single solvents by themselves do not dissolve a sufficient proportion of the ethers to make a desirably thick, flowable composition or dope, such as may be used, for example, in the manufacture of photographic film base by customary methods, or in other plastic arts.

I have discovered, however, that an adequately strong and useful solvent may be prepared by mixing such alcohols with phenyl propyl alcohol. I may combine, for instance, methyl alcohol, ethyl alcohol, propyl alcohol, isopropyl alcohol, butyl alcohol (normal, iso or secondary) and fusel oil or the amyl alcohols, ether singly or in various mixtures with phenyl propyl alcohol.

The proportions may be greatly varied, but I find that a very useful range is from 50 to 10 parts by weight of alcohol mixed with 50 to 90 parts of phenyl propyl alcohol. In the compound solvents thus prepared I dissolve, for example, water-insoluble ethyl cellulose until thick viscous flowable solutions thereof are obtained. Of course, the amount of cellulose ether thus dissolved can be greatly varied, but I may mention a solution containing 1 part of the ether to 5 parts of the compound solvent by weight as merely one example. Other substances which impart additional suppleness or incombustibility, or other qualities to the film, may be then added to the dope, such modifying agents being, for example, triphenyl phosphate, camphor, tricresyl phosphate, etc. The phenyl propyl alcohol, being of relatively low volatility, remains in considerable amounts in the film and imparts useful properties thereto.

The ingredients are of the ordinary commercial type and sufficiently purified for the process of film manufacture, so as to give a dope yielding films having the proper relative freedom from color. The viscous-flowable dope above described can be used in connection with the film-forming apparatus without the necessity of expensive alterations in the latter.

Having thus described my invention, what I claim as new and desire to secure by Letters Patent is:

1. A viscous flowable film-forming composition, comprising an alkyl ether of cellulose dissolved in a mixture of phenyl propyl alcohol and a monohydroxy aliphatic alcohol.

2. A viscous flowable film-forming composition, comprising an alkyl ether of cellulose dissolved in a compound solvent containing from 50 to 90 parts by weight of phenyl propyl alcohol and from 50 to 10 parts by weight of a monohydroxy aliphatic alcohol.

3. A viscous flowable film-forming composition, comprising an alkyl ether of cellulose dissolved in a compound solvent containing approximately 50 parts by weight of phenyl propyl alcohol and 50 parts of methyl alcohol.

4. A viscous flowable film-forming composition, comprising water-insoluble ethyl cellulose dissolved in a compound solvent containing phenyl propyl alcohol and a liquid monohydroxy aliphatic alcohol.

5. A composition of matter, comprising 1 part by weight of water-insoluble ethyl cellulose dissolved in approximately 5 parts by weight of a compound solvent containing approximately equal parts by weight of phenyl propyl alcohol and a liquid monohydroxy aliphatic alcohol.

6. A composition of matter comprising an ether of cellulose and phenyl propyl alcohol.

7. As an article of manufacture, a flowed or deposited film comprising an alkyl ether of cellulose and phenyl propyl alcohol.

8. As an article of manufacture, a deposited or flowed flexible transparent film, comprising water-insoluble ethyl cellulose and phenyl propyl alcohol.

Signed at Rochester, New York, this 21st day of April 1921.

STEWART J. CARROLL.